Sept. 29, 1959 D. A. DI TIRRO ET AL 2,906,246
CONTROL SYSTEM FOR FLUID ACTUATED DEVICES
Filed June 18, 1953 5 Sheets-Sheet 1

INVENTORS.
Domenic A. DiTirro,
Russell J. Cameron.
BY
Harness, Dickey & Pierce
ATTORNEYS.

Sept. 29, 1959 D. A. DI TIRRO ET AL 2,906,246
CONTROL SYSTEM FOR FLUID ACTUATED DEVICES
Filed June 18, 1953 5 Sheets-Sheet 2

INVENTORS
Domenic A. DiTirro,
Russell J. Cameron,
BY
Harness, Dickey & Pierce
ATTORNEYS

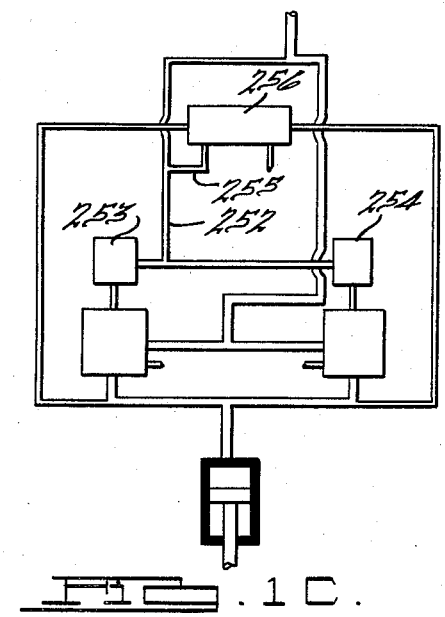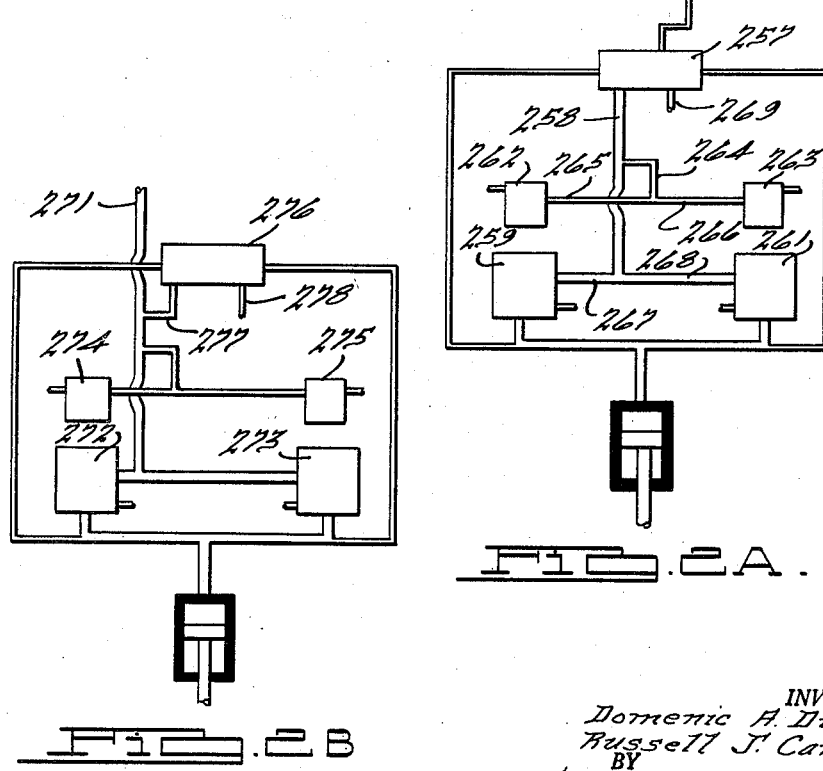

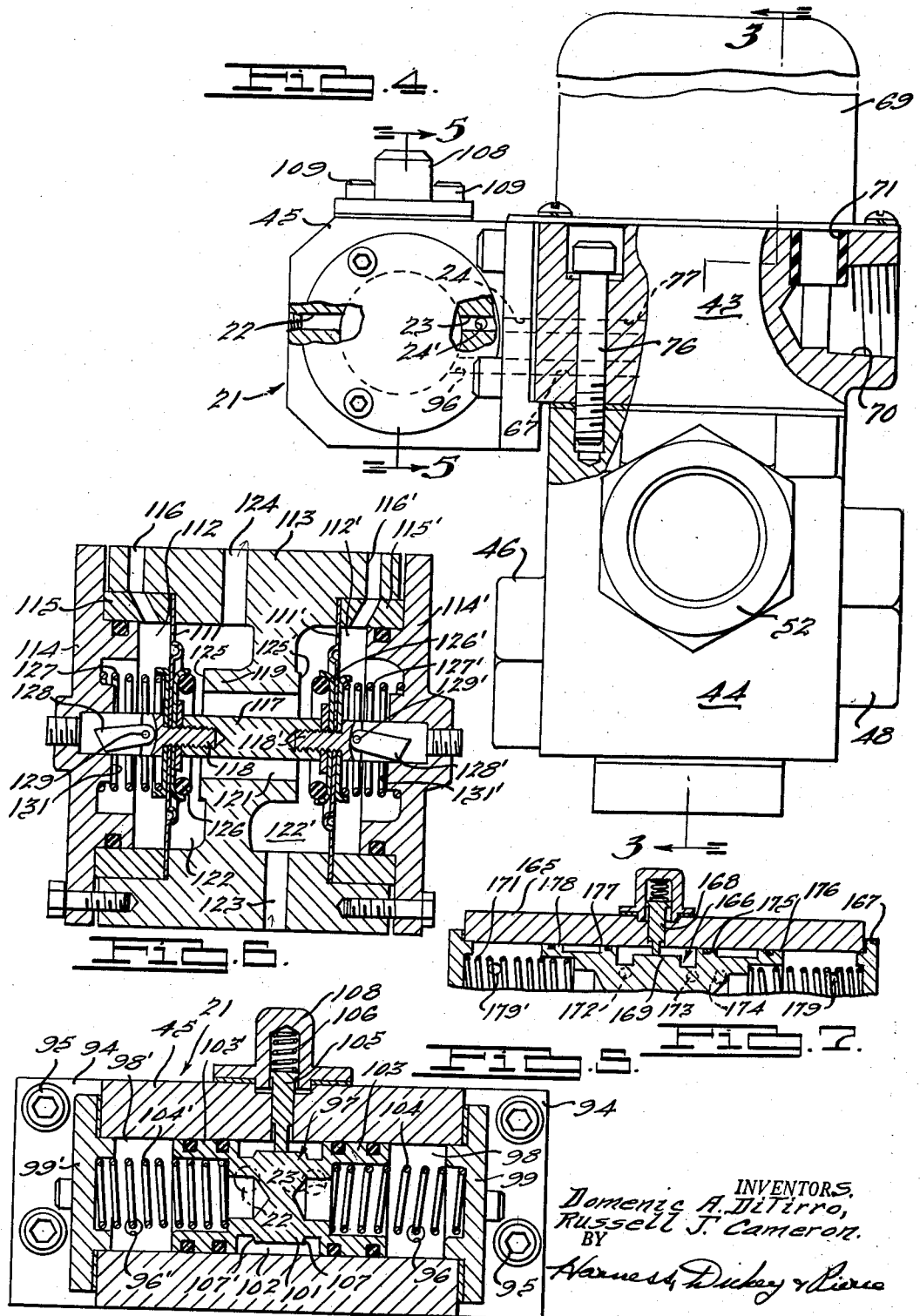

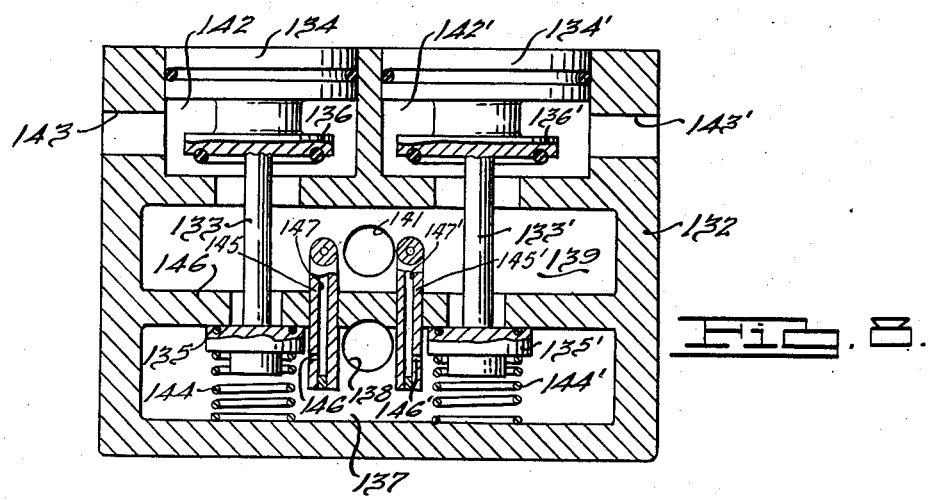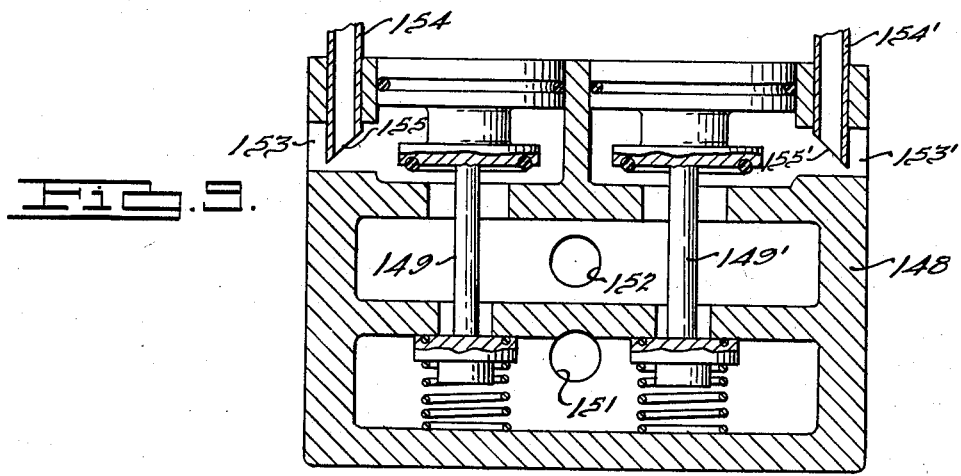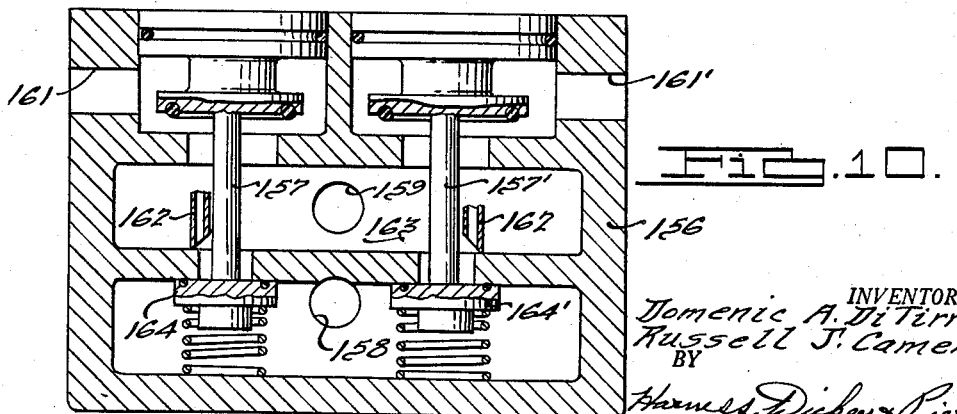

United States Patent Office 2,906,246
Patented Sept. 29, 1959

2,906,246

CONTROL SYSTEM FOR FLUID ACTUATED DEVICES

Domenic A. Di Tirro, Royal Oak, and Russell J. Cameron, Birmingham, Mich., assignors to Ross Operating Valve Company, Detroit, Mich., a corporation of Michigan Application June 18, 1953, Serial No. 362,542

25 Claims. (Cl. 121—38)

This invention relates to control systems for fluid pressure actuated devices, and more particularly to safety means for such devices operable in cases of failure of some part of the system, such as the master or pilot valves. This application is a continuation-in-part of application Serial No. 342,786, now abandoned, filed March 17, 1953, by the present applicants.

The cyclic operation of fluid pressure actuated devices such as pneumatically actuated clutches and brakes for presses and similar machines entails the use of control valves for admitting and releasing the fluid under pressure to the devices, and in cases of failure of these control valves there arises the danger of injury to the operator or damage to the machine due to continued and uncontrolled application of fluid pressure. It is highly desirable in such cases that automatic means be provided for shutting off the supply of air or other fluid or at least reducing the supply pressure to the point where the machine is inoperative, so that injury or damage is avoided.

The present invention has for an object the provision of an improved system for achieving this result, and provides means for automatically sensing the failure of a control valve and for instantaneously shutting off or reducing the fluid pressure at the fluid actuated device until the system can be conveniently repaired by the operator.

The use of safety valves responsive to changes in velocity or volume of fluid to shut off supply to a fluid actuated device is well known in control systems. Such devices however have inherent disadvantages, for example when using pneumatic pressure controlled by poppet type valves. In such installations the velocity of the initial pressure front when the control valve is opened is so great as to make a velocity responsive safety valve unsuitable. Volume responsive safety valves are useful only in systems within a narrow capacity range, so that different sizes of these valves must be provided for different types of installations.

It is therefore another object of this invention to provide an improved system of the above nature, having a safety valve unit responsive to flow conditions existing at the control valves, the safety valve unit being of universal application so that the same unit may be installed in systems having varying ranges of volume, pressure and velocity.

It is also an object of this invention to provide a novel and improved system for controlling the supply and exhaust for a pressure actuated device, in which a plurality of control valves are placed in parallel and operate in synchronism to supply and exhaust fluid pressure, the failure of one of such valves causing the safety means to become operative to prevent the control system from further operating the device.

It is a further object to provide a safety control system of the above nature, which is adapted for use either with pilot operated control valves or with control valves not using pilots, and in which the safety means may control the fluid pressure supply to either the pilot valves or to the main control valves or to both, and in one form of the invention, control both supply and exhaust to these valves.

It is also an object to provide an improved safety control system having the above described characteristics, which operates by means of the sensing of pressure differentials between the control valves operating in parallel, such pressure differential causing instantaneous operation of the safety means to shut off the supply pressure, and in one form of the invention, to exhaust the control valves.

It is another object of the invention to provide an improved system of the above character, in which the pressure differential sensing means can be placed at various points in the control system depending on the nature of the particular installation.

It is also an object to provide an improved safety control system for fluid operated devices of the above nature, in which means are provided for magnifying the pressure differentials in the system thereby enchancing the sensitivity of the safety means without interfering with the efficiency of the control valves.

Other objects, features, and advantages of the present invention will become apparent from the subsequent description, taken in conjunction with the accompanying drawings.

In the drawings:

Figure 1C shows still another modification of the novel control system using a two-way safety valve for venting the supply line;

Figure 2A shows still another modification of the control system in which the safety means controls pressure to both the main and pilot valves;

Figure 2B shows a further modification similar to Figure 2A but using a two-way safety valve for venting the supply lines to the main and pilot valves;

Figure 4 is an elevational view of the valve housing, showing the port connections and also showing a preferred mounting of the safety valve on the valve housing, parts being cross sectioned for clarity;

Figure 5 is a cross-sectional view of a preferred safety valve of the shuttle type, taken along the line 5—5 of Figure 4;

Figure 6 is a cross-sectional view similar to Figure 5 of another embodiment of the safety valve, utilizing a pair of diaphragms responsive to pressure differentials;

Figure 7 is a fragmentary cross-sectional view similar to Figure 5 and showing a modified safety valve which serves to exhaust the control valves as well as shut off their fluid supply;

Figure 8 is a side elevational view in cross-section of another embodiment of the main control valves, in which the sensing points for the safety valve are located at the inlet ports;

Figure 9 is a side elevational view in cross-section showing another modification of the control valves in which the sensing points are located at the exhaust ports; and Figure 10 is a side elevational view in cross-section of still another modification of the control valves, the sensing points for the safety valve being located at the outlet ports.

Figures 1, 2, 3:
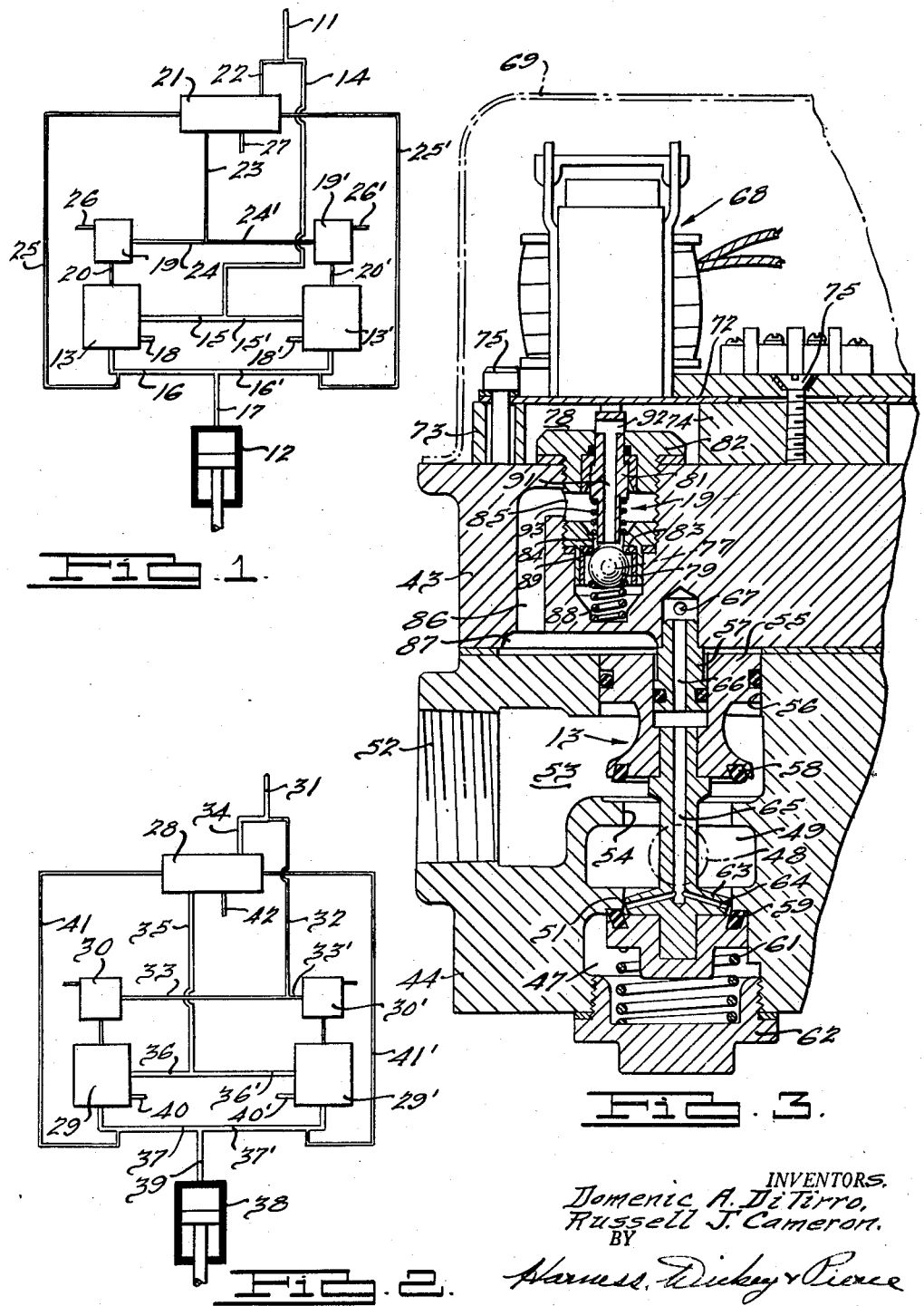
Figure 1 is a diagrammatic view of one form of a control system for a fluid actuated device according to the invention, in which a safety means controls the fluid supply to the pilot valves, or alternatively, both supply and exhaust to these valves.
Figure 2 is a diagrammatic view of another modification of the improved safety control system, the safety means controlling the pressure to the main control valves.
Figure 3 is a fragmentary side elevational view in cross section along the line 3—3 of Figure 4 showing a preferred embodiment of one of the main control valves and its associated pilot valve in the system according to Figure 1, the valves being shown as embodied in a housing which also includes the other main valve and pilot valve.

Figure 1 illustrates one arrangement of the safety control system according to the present invention, the system controlling the application of fluid pressure from a supply line 11 to a single acting cylinder 12. As will appear more clearly below, the invention could also be applied to systems for controlling double acting fluid pressure motors by a duplication of parts or a variation in type of valve, and could likewise be applied to other types of fluid actuated devices. The system includes a pair of main control valves 13 and 13' which control the supply and exhaust for motor 12. The fluid is supplied to the main valves by means of conduit 14 leading from supply line 11 and having cross branches 15 and 15' leading to the control valves. The valves have outlet connections 16 and 16' leading to motor 12, these lines joining into a single conduit 17. Valves 13 and 13' may be of a three-way type having exhaust ports 18 and 18' respectively, and it will therefore be seen that the valves operate in parallel to supply and exhaust the fluid which operates motor 12.

The movement of main valves 13 and 13' is controlled by pilot valves 19 and 19' which may for example be solenoid operated valves having fluid connections 20 and 20' to the actuating portions of main valves 13 and 13'. The fluid for supplying the pilot valves and lines 20 and 20' is also taken from main supply line 11 but passes through a normally open safety valve 21 by means of conduits 22, 23, and branch conduits 24 and 24'. As described in detail below, safety valve 21 is movable from its inactive normal position to a safety position in response to pressure differentials caused by lack of synchronism between main valves 13 and 13'. This lack of synchronism could be caused for example by failure of a part in one of the main valves or in one of the pilot valves. Lines 25 and 25', which may be termed sensing lines or conduits, represent diagrammatically the connections by which pressure differentials between the parallel control branches may be sensed by safety valve 21. These sensing conduits are shown in Figure 1 as being connected to the outlet lines 16 and 16' of main valves 13 and 13' respectively, although as is pointed out below the sensing conduits could be located in other parts of the system, for example at other points in the main valves or at the pilot valves 19 and 19'.

In the operation of the system shown in Figure 1, the safety valve 21 will normally remain inactive and in its open position, allowing free passage of fluid from main supply line 11 to the pilot valves 19 and 19'. These valves in turn will alternately move main valves 13 and 13' in synchronism between their supply and exhaust positions, thus cycling motor 12. During this operation, the pressure in lines 16 and 16' leading from the main valves to the motor 12 will at all times be substantially equal, since the main valves are operating in parallel. Should one of the main valves or one of the pilot valves fail to function properly, a pressure differential will immediately set up between lines 16 and 16', and this pressure differential will be transmitted by sensing lines 25 and 25' to safety valve 21. This valve will immediately move into its safety position, shutting off the fluid supply to pilot valves 19 and 19', or in other forms of the invention, connecting the pilot valve supply lines to exhaust with or without shutoff of fluid supply.

As described in detail below, the relation of pilot valves 19 and 19' to their respective main valves is such that when lines 20 and 20' are pressurized, the main valves are moved to their supply position, supplying fluid to lines 16 and 16'. When lines 20 and 20' are connected to exhaust openings 26 and 26' of the pilot valve, main valves 13 and 13' are moved into their exhaust position, in which lines 16 and 16' are connected to exhaust ports 18 and 18' respectively. It will therefore be seen that when safety valve 21 is held closed, at least one of the main valves 13 and 13' will be moved into and will remain in its exhaust position. This can be demonstrated by examining what happens in each of the eight possible cases of valve failure, that is, with failure of either pilot valve 19 or 19' in its supply or exhaust position, or failure of either main valve 13 or 13' in its supply or exhaust position.

Taking first the case where pilot valve 19 has failed or is stuck in its exhaust position for line 20, when the cycle control next causes valves 19 and 19' to be urged to their supply position, only valve 19' will respond. This will cause pressure to be applied in pilot connection 20', thus moving main valve 13' to its supply position. Main valve 13 meanwhile will remain in its exhaust position since pilot valve 19 has not moved. Consequently, a pressure differential will be set up between sensing lines 25 and 25', causing safety valve 21 to move into its cutoff position, where it will be held by a detent mechanism described below. Fluid pressure leading to pilot valves 19 and 19' will thus be cut off.

Meanwhile, the fluid passing from main valve 13' to line 16' will be tapped off through line 16 and main valve 13, since the latter is in its exhaust position. As will appear in detail below, the relative dimensions of the valves and conduits are preferably such that this exhausting of the supply fluid from line 16' to line 16 will sufficiently reduce the pressure in line 17 so as to prevent operation of motor 12. Thus, even though the supply of fluid to motor 12 is not yet entirely shut off, the system is prevented from operating motor 12 and therefore avoids the possibility of injury to the operator or damage to the equipment.

When the cycle control next urges pilot valves 19 and 19' toward their exhaust position, valve 19' will so move, causing main valve 13' to move into its exhaust position. Both main valves will thereafter remain in their exhaust position, since the subsequent actions of the cycle control will have no effect, safety valve 21 remaining in its cutoff position, and motor 12 will remain inoperative. A sequence of events similar to that described above will of course prevail if pilot valve 19' should fail in its exhaust position.

Assuming next a condition in which main valve 13 fails in its exhaust position, when the system is next cycled to cause pilot valves 19 and 19' to move to their supply position, main valve 13' will move to its supply position while main valve 13 remains in exhaust position. As before, the consequent pressure differential between sensing lines 25 and 25' will cause safety valve 21 to move into and remain in its cutoff position. The fluid supplied through main valve 13' to line 16' will again be tapped off through line 16 to faulty main valve 13 and will be exhausted, motor 12 thus becoming inoperative. When the system is next cycled to cause pilot valves 19 and 19' to move into their exhaust position, main valve 13' will be moved to exhaust where it will remain, since the fluid supply to the pilot valves has been cut off by safety valve 21. A similar sequence of actions will of course occur should main valve 13' become stuck in its exhaust position.

Assuming now a case where pilot valve 19 has failed in its supply position for line 20, when the system is next cycled to cause the pilot valves to move to their exhaust position, main valve 13' will move to its exhaust position, while main valve 13 remains in its supply position. The consequent pressure differential between sensing lines 25 and 25' will again cause safety valve 21 to move into its cutoff position. Meanwhile, the fluid supplied by main valve 13 will be tapped off through main valve 13', motor 12 thus becoming inoperative. When the system is next cycled to move pilot valves 19 and 19' to their supply position, the movement of valve 19' will have no effect since its fluid supply is cut off. Subsequent cycling will therefore have no effect on either pilot valve or either main valve, and while the fluid supply to main valve 13 is not cut off in this example, this fluid supply will have no effect in operating motor 12 since it will be tapped off by main valve 13' which remains in its exhaust position. A similar sequence of actions will occur should pilot valve 19' become stuck in its supply position.

Lastly, assuming a condition in which main valve 13 fails in its supply position, when the system is next cycled to move pilot valves 19 and 19' to their exhaust position, main valve 13' will likewise move to its exhaust position, setting up a pressure differential between sensing lines 25 and 25' which will move safety valve 21 into its cut-off position. Meanwhile, the fluid supplied through stuck main valve 13 will be tapped off through main valve 13', and motor 12 will become inoperative. Subsequent cycling which moves pilot valves 19 and 19' to their supply positions will have no effect since their fluid supply is cut off by safety valve 21, and main valve 13' will remain in its exhaust position. The fluid which continues to flow through stuck main valve 13 will therefore continue to be tapped off through valve 13', and motor 12 will remain inoperative even though the fluid supply is not completely shut off.

It will be appreciated that the operation of the safety control system of this invention is not dependent on the measurement of velocity or volume of the pressure fluid which operates the motor, but is responsive to pressure differentials between two parallel control branches which normally operate in synchronism. For this reason, the system is especially advantageous in installations where there are large variations in fluid velocity or in fluid volume, since the safety means need not be constructed to take into account such variations. For example, a safety valve 21 constructed according to the invention could be utilized in installations having greatly varying sizes of control valves 13 and 13' or of pilot valves 19 and 19', and could also be used in systems with greatly varying fluid velocities and rates of flow.

It will also be seen that the safety control system of this invention is equally applicable to double acting motors instead of the single acting motor 12 shown in Figure 1. In such cases, duplicate control valves 13 and 13' having pilot valves 19 and 19' would be provided for the other side of the motor, and the fluid pressure controlled by these duplicate valves could be sensed by the same safety valve 21, the outlet of which would supply fluid to all four of the pilot valves 19 and 19'. Upon failure of any valve on either side of the motor, the safety valve 21 would act to shut off the supply of fluid to all four pilot valves, with the results described above with respect to the single acting motor. Alternatively, independent safety valves could be provided for the two sides of the system, each side operating in an independent manner.

Figures 1A, 1B:
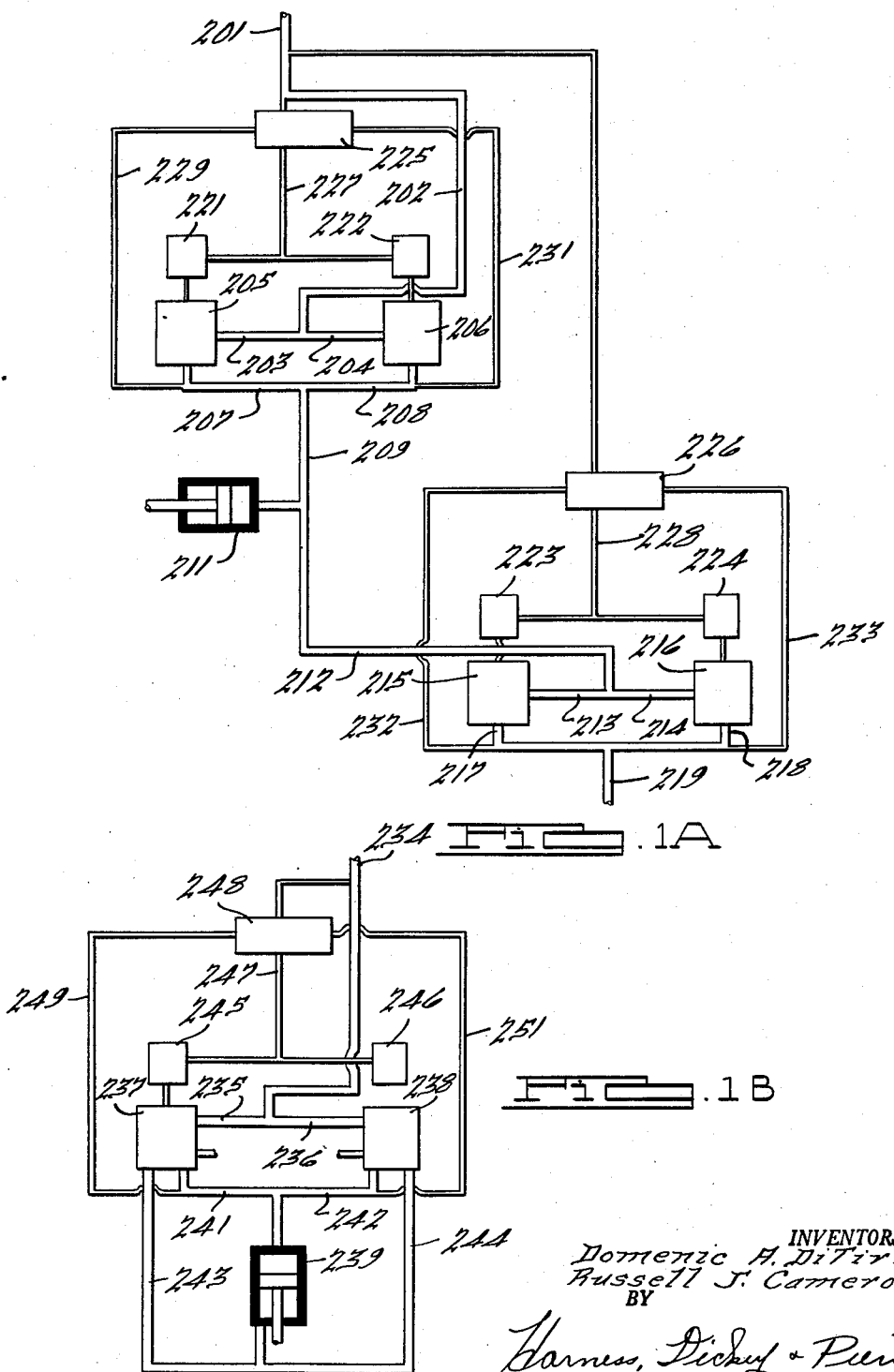
Figure 1A is a diagrammatic view of a modified form of the novel control system in which two-way main valves are used.
Figure 1B shows a further modification of the system using four-way main valves.

Figure 1A shows a modified form of the control system which utilizes a plurality of two-way valves as the main valves in place of three-way valves 13 and 13'. As shown, the system comprises a supply conduit 201 which supplies fluid through a branch conduit 202 and parallel conduits 203, 204 to a pair of two-way valves 205, 206 which act as the supply valves. These valves in turn supply fluid through parallel conduits 207, 208 to a conduit 209 leading to fluid actuated device 211. The venting of device 211 is accomplished through a conduit 212 which leads through parallel conduits 213, 214 to a second pair of two-way valves 215, 216 acting as the exhaust valves and leading through parallel conduits 217, 218 to a vent 219.

Valves 205, 206, 215 and 216 are controlled by pilot valves 221, 222, 223 and 224 respectively. As in the embodiment of Figure 1, the safety means is disposed in the supply conduits for these pilot valves, and comprises the normally open safety valves 225, 226. Valve 225 controls the supply conduit 227 to pilot valves 221 and 222, while valve 226 controls the supply conduit 228 to pilot valves 223 and 224. As in the previous embodiment, sensing connections 229 and 231 extend between safety valve 225 and parallel branches 207 and 208, while sensing connections 232 and 233 are provided between safety valve 226 and parallel branches 217 and 218.

Figure 1B illustrates a further modification of the invention using four-way valves. In this embodiment, a supply conduit 234 is provided to supply fluid to parallel supply branches 235 and 236, leading to four-way valves 237 and 238. These valves control the flow of fluid to and from opposite sides of a fluid actuated device 239 comprising a double acting cylinder. For this purpose the valves are provided with parallel branches 241 and 242 leading to the upper end of device 239, and parallel branches 243 and 244 leading to the lower end of the fluid actuated device. Pilot valves 245 and 246 control main valves 237 and 238 respectively, and the supply conduit 247 for these pilot valves is, as in the previous embodiments, controlled by a safety valve 248. Sensing lines 249 and 251 are connected between safety valve 248 and parallel branches 241 and 242 respectively in this embodiment.

It should also be noted that the concept of parallel control branches for the fluid actuated device, normally operating in synchronism, not only permits the safety means to be actuated by pressure differentials between the branches, but also permits the fluid actuated device to be disenabled even though the supply fluid to the main valves is not entirely cut off. Specifically, in cases where the pilot valve or main valve in one of the branches fails in its supply position, the tapping of supply fluid through the main valve of the other branch, which is held in its exhaust position, effectively disenables the motor even though fluid supply continues through the faulty branch.

Figure 1 also illustrates an alternate method of operation of safety valve 21 in which the supply line 23 for pilot valves 19 and 19' is not only cut off from fluid supply, but is also connected to exhaust through safety valve 21. The exhaust connection is indicated in Figure 1 at 27, and when the safety valve moves into its safety position, exhaust line 27 is connected to line 23 at the same time that the latter line is cut off from supply line 22. Figure 7, which is described in detail below, illustrates a three-way type of safety valve which could be used in carrying out this exhausting action. It will be seen that a system using a valve such as is shown in Figure 7 will not only shut off fluid supply to the pilot valve supply line but will connect the pilot valve supply line to exhaust so that no fluid is at any time trapped in the pilot valve connections, and the system can be disenabled immediately when the safety valves moves into its safety position.

Figure 1C illustrates a further modification of the control system in which a two-way safety valve is used for the purpose of connecting the pilot valve supply line to exhaust. In this embodiment, a supply conduit 252 is provided for pilot valves 253 and 254, and a branch 255 leads from this conduit to a two-way safety valve 256. Safety valve 256 is movable from a normally closed position to a safety position venting supply line 252 without positively shutting off the fluid supply. The remaining portions of this system are similar to Figure 1 and need no further description.

The system illustrated diagrammatically in Figure 2 is basically similar to that of Figure 1 but shows the safety valve 28 controlling the fluid pressure supply to the main valves 29 and 29' instead of to the pilot valves 30 and 30'. In this system, the main supply line 31 has a direct connection to the pilot valves 30 and 30' through conduit 32 having branch conduits 33 and 33'. The fluid supply to the main valves however passes from the main supply line 31 through conduit 34 to safety valve 28, and thence through conduit 35 having branches 36 and 36' to the main valves. These valves are provided with outlet lines 37 and 37' leading to motor 38 through conduit 39, and the valves also have exhaust connections 40 and 40'. Sensing lines 41 and 41' are provided between outlet lines 37 and 37' and the safety valve 28. As in Figure 1, safety valve 28 in an alternate embodiment may be provided with an exhaust port 42 for exhausting line 35 when the latter is cut off from supply line 34, or a two-way safety valve could be provided for merely exhausting line 35 as described with respect to Figure 1C.

In the operation of the system shown in Figure 2, failure of either of the pilot valves or main valves will cause safety valve 28 to move into its closed position due to the pressure differential between sensing lines 41 and 41'. When in this position, the supply of fluid to main valves 29 and 29' will be immediately cut off, thus preventing motor 38 from further operation.

It will be seen that, as contrasted with the system of Figure 1, this system does not depend upon the tapping off of fluid from one of the parallel control branches to the other branch when a valve in the first branch fails in its supply position. It should also be noted that a system like that shown in Figure 2 could be used in installations which omit the pilot valves, since the safety valve directly controls the supply of fluid to the main valves themselves.

Figure 2A illustrates a modified form of the novel control system which is basically similar to that of Figure 2 but in which the safety valve controls the fluid supply at both main valves as well as both pilot valves. In this embodiment, fluid is supplied from safety valve 257 through a conduit 258 to both main valves 259 and 261 as well as to both pilot valves 262 and 263. For this purpose, conduit 258 has a branch 264 leading to parallel conduits 265 and 266 which connect with pilot valves 262 and 263. Conduit 258 also is connected with parallel supply conduits 267 and 268 leading to main valves 259 and 261 respectively. With this arrangement, upon movement of the safety valve into its safety position the fluid supply to both pilot valves and both main valves would be cut off. If a safety valve of the type shown in Figure 7 is used, both pilot valve and both main valve supply lines would further be connected to exhaust through safety valve 257 and its exhaust port 269 shown in Figure 2A.

Figure 2B illustrates still another modification which is similar to Figure 2A in that the supplies to both main and pilot valves are controlled by the safety valve, but differs therefrom in that the safety valve is of a two-way type which vents these supply lines instead of shutting off the fluid supply. In this embodiment, a supply conduit 271 is provided for both main valves 272 and 273 as well as both pilot valves 274 and 275. A two-way safety valve 276 is connected with conduit 271 by a branch conduit 277, and is movable between a closed position and a vent position in which supply conduit 271 is vented through an exhaust port 278.

Figures 3, 4 and 5 show preferred embodiments of the main valves and safety valves used in carrying out the invention, the arrangement being illustrated as connected according to the system of Figure 1. Figure 3 shows in detail the structure of the main valve generally indicated at 13, and also shows the structural details of the pilot valve generally indicated at 19. It will be understood that in the preferred embodiment valves 13' and 19' are enclosed and supported by the same housing structure that supports valves 13 and 19, but this structure is broken away in Figure 3 since valves 13' and 19' are identical with the valves shown. Although the main and pilot valves are shown as being enclosed in a single housing, other types of valves could be used within the scope of the invention, and the valves may if desired be enclosed in separate and independent housings.

The housing preferably comprises an upper portion 43 which generally supports and encloses the pilot valves 19 and 19', and a lower housing portion 44 which encloses the main valves 13 and 13' and their attendant parts. Mounted on the side of upper housing portion 43 is the safety valve generally indicated at 21, this valve having a housing 45.

The housing portions 43, 44 and 45 are provided with ports and passageways for conducting the working fluid, and in particular the lower housing portion 44 has a supply port 46 leading to a chamber 47, which is adapted to be connected to supply conduit 15 shown in Figure 1. The lower housing portion is also provided with a port 48 which may be termed an outlet port, since it is connected to motor 12 through conduit 16. Port 48 leads to a chamber 49 in the lower housing portion 44 which is disposed above chamber 47, these chambers having a valve seat 51 disposed between them. An exhaust port 52 is also provided in lower housing portion 44, this port connecting with a chamber 53 and adapted to be connected to exhaust conduit 18. Chamber 53 is disposed above chamber 49 and a valve seat 54 is disposed between these two chambers.

Main valve 13 which controls the connections between chambers 47, 49 and 53 is shown as being a valve spool and has an actuating piston head 55 at its upper end, sliding in a guide portion 56 in housing 44 and being centrally guided by downwardly extending member 57 held by housing portion 43. The valve spool 13 carries an exhaust valve 58 and intake valve 59, these valves being of the poppet type and cooperating with valve seats 54 and 51 respectively. In particular, exhaust valve 58 faces downwardly, and the valve spool 13 extends downwardly from valve 58 through valve seat 54, the lower end thereof carrying upwardly facing intake valve 59. A helical spring 61 is disposed between the lower end of the valve spool and the lower end of housing portion 44, being held in place by removable cap 62. It will be seen that the expanding action of spring 61 will normally hold intake valve 59 against valve seat 51, and exhaust valve 58 will thus be normally open.

Means are provided for sensing the pressure at valve 59, and this means includes a substantially radial shoulder portion 63 on valve spool 13 immediately above intake valve 59. This radial shoulder is provided with a plurality of radial sensing passages 64, and the proportions of the radial shoulder are such that sensing passages 64 extend relatively close to the internal periphery of valve seat 51 and are downwardly inclined. The inner ends of sensing passages 64 connect with an axial passage 65 in valve spool 13, this axial passage extending upwardly and connecting with an axial passage 66 in guide member 57. Passage 66 is connected in turn with a passage 67 in housing portion 43, and passage 67 is connected by sensing conduit 25, shown in Figure 1, with the safety valve 21. A similar construction of course exists in valve 13', so that the safety valve 21 is sensitive to pressure differentials existing between the intake portions of main valves 13 and 13'.

It should be noted that the radial shoulder 63 acts as a restriction when valve spool 13 is moved to its downward position, that is when intake valve 59 is open and exaust valve 58 is closed. The resultant pressure drop across valve seat 51 because of this restriction causes the radial sensing passages 64 to be sensitive to changes in pressure at the intake valve, and the inclined nature of these passages will also increase their sensitivity to velocity changes. It should be stated that the particular construction of the radial shoulder 63 with its passages 64 and the axial passage 65 is in itself conventional, and it will be understood that other types of sensing means such as those described below could be used within the scope of the invention.

As indicated above, main valve 13 is controlled by pilot valve 19 which in the illustrated embodiment is a three-way solenoid operated valve, being movable between its positions by a solenoid assembly generally indicated at 68 and enclosed by a cover 69. Housing portion 43 is provided with an aperture 70, seen in Figure 4, for receiving the electrical wiring (not shown) for solenoid 68, this wiring being receivable within a vertical passage 71 leading from aperture 70. Solenoid assembly 68 is supported on housing portion 43 by means of a platform 72 held in spaced relation above the housing by supporting members 73 and 74 secured by bolts 75, housing portion 43 being in turn secured to housing portion 44 by bolts 76.

The pilot valve is provided with an intake passage 77 shown in dot-dash lines in Figure 3 which is disposed within housing portion 43, and the space 78 between housing portion 43 and platform 72 acts as an exhaust passage for the valve. As shown in the illustrated embodiment, valve 19 is of the ball type and includes a spherical valve member 79 actuatable between its open and closed positions by a plunger 81 connected to solenoid 68. Plunger 81 is guided by a member 82 which is mounted in the upper portion of housing portion 43, the lower end of member 82 carrying a valve seat 83 against which valve 79 seats when in its closed position. An axial passage 84 in member 82 extends from valve seat 83 to a radial passage 85, the radial passage being in turn connected with a vertical passage 86 in housing portion 43 which leads to a main valve operating chamber 87 connecting with piston portion 55 of main valve 13. It will therefore be seen that when valve 79 is moved away from valve seat 83, fluid from inlet 77 will pass through passages 84, 85 and 86 to chamber 87 where it will act on valve 13 to move the same into its supply position.

Means are provided in the pilot valve for exhausting chamber 87 when valve 79 is in its closed position. As shown, a helical spring 88 within housing portion 43 urges valve 79 into its closed position. The lower end of plunger 81 is spaced above ball 79 when the plunger is in its upper position to provide a space 89 which connects with an axial passage 91 in the plunger, the latter in turn being connected to a radial passage 92 at the upper end of plunger 81 which connects with exhaust chamber 78. A helical spring 93 is also provided for urging plunger 81 into its upper position, and it will therefore be seen that when in this upper position main valve operating chamber 87 will be connected to exhaust chamber 78 through passages 86, 85, 84, 89, 91 and 92. Operating chamber 87 will thus be allowed to return the exhaust pressure, permitting main valve 13 to return to its exhaust position. When plunger 81 is moved downwardly its lower end engages ball 79, sealing off exhaust passage 91 so that fluid may be supplied to chamber 87. It should be noted that spring 93 urges plunger 92 into its upper or exhaust position independently of spring 88, so that in the event some obstruction should prevent the spherical valve member 79 from closing, pilot valve 19 and thus main valve 13 will still be returned to their exhaust positions.

As described previously in the discussion of Figure 1, the supply fluid to pilot valve 19 passes through safety valve 21. As seen in Figure 4, the inlet passage 77 to the pilot valve is fed by passage 24 which leads from safety valve 21, and which corresponds to branch line 24 in Figure 1. In particular, the safety valve is provided with an inlet passage 22 and an outlet passage 23, the outlet passage branching into passages 24 and 24'. It will be noted that these reference numerals correspond with the reference numerals for the safety valve inlet and outlet lines in Figure 1. Since the safety valve 21, as described below, is in normally open position, there is a free connection between inlet passage 22 and inlet ports 77 and 77' of the pilot valves 19 and 19'.

As indicated above, safety valve 21 is mounted on the side of upper housing portion 43, and in particular a pair of flanges 94 on the safety valve housing 45 is secured by bolts 95 to housing portion 43 in such a manner that passage 24 is aligned with passage 77 and passage 24' is aligned with passage 77' (not visible in the figures). Safety valve housing 45 is also provided with passages 96 and 96' which are aligned with sensing passages 67 and 67' in housing portion 43. Passage 96 and passage 67 therefore together form what is referred to as sensing line 25 in Figure 1, while passages 96' and 67' together form sensing line 25'. It will be observed that these lines are at all times open, so that the safety valve is always subjected to the pressure differentials existing between the sensing lines.

The construction of safety valve 21 is best shown in Figure 5, wherein it will be seen that the valve includes a spool member generally indicated at 97 slidable within housing 45. Spool 97 serves to form chambers 98 and 98' at either end thereof, the outer ends of these chambers being closed by housing caps 99 and 99'. Sensing passages 96 and 96' are connected with chambers 98 and 98', these passages being a substantial distance from spool 97 when the latter is in its central position as shown in Figure 5. The central portion 101 of spool 97 is recessed to form an annular chamber 102, and inlet passage 22 (shown in dot-dash lines in Figure 5) as well as outlet passage 23 are connected with this annular chamber. The axial positions of passages 22 and 23 are such that when spool 97 is in its central position, the piston portions 103 and 103' thereof are immediately adjacent passages 23 and 22 respectively. In other words, if spool 97 is moved either to the right or left, the communication between passages 22 and 23 will be cut off either by piston 103 or piston 103'. Helical springs 104 and 104' are disposed between spool 97 and opposite ends of the housing, that is, caps 99 and 99', and thus serve to hold spool 97 in its central position.

Means are provided for locking spool 97 when it is moved either to the right or left into its cutoff position by pressure differentials existing between chambers 98 and 98'. In the illustrated embodiment, this means comprises a slidable detent 105 mounted in housing 45 and urged by a helical spring 106 against central portion 101 of the spool. This central portion is provided with annular shoulders 107 and 107', so that when the spool is moved in either direction an amount sufficient to close either passage 22 or 23, detent 105 will engage one of the shoulders to hold the spool in its cutoff position. A cap 108 removably held by bolts 109 serves to guide detent 105 and retain spring 106, so that by removing cap 108 the detent 105 can be withdrawn, allowing the spool to return to its normally open position.

Although the overall operation of the control valve system shown in Figures 3–5 can be comprehended from the description of operation of the system of Figure 1, it is believed desirable to describe the particular functions of the elements in this illustrated embodiment. It should be kept in mind of course when studying the operation of the embodiment of Figures 3–5, that valves 13' and 19', identical with valves 13 and 19, are also enclosed and supported by housing portions 43 and 44, although as mentioned previously these valves may have separate housings if desired.

Assuming an initial condition in which safety valve 21 is in its normally open position as shown in Figure 5, supply fluid will pass through passage 22, chamber 102, passage 23, branch passages 24 and 24' to branch passages 77 and 77' in parallel, thus leading to the inlet sides of pilot valves 19 and 19'. Assuming solenoid 68 which controls valve 19 to be de-energized, valve member 79 will engage valve seat 83, and main valve operating chamber 87 will be connected to exhaust through passages 86, 85, 84, 89, 91 and 92 leading to exhaust space 78. Since the solenoids controlling pilot valves 19 and 19' are synchronously timed, valve 19' will be in a position similar to valve 19. Main valve 13 will therefore be in its exhaust position, in which outlet passage 48 leading to the motor or other device is connected to exhaust passage 52, supply port 46 being closed by inlet valve 59.

The pressures sensed by sensing passages 64 in valve 13 will therefore be substantially atmospheric, and these pressures will be transmitted through passages 65, 66, 67 and 96 to chamber 98 of safety valve 21. Since valve 13' is in the same position as valve 13, there will be no pressure differentials between chambers 98 and 98', and spool 97 of the safety valve will thus remain in its central or open position. When solenoid 68 is energized, member 81 will be moved downwardly, carrying valve member 79 away from its valve seat and closing passage 92 which leads to exhaust. Since safety valve 21 allows free passage of pilot valve supply fluid, the fluid will flow from passage 77 through passages 84, 85 and 86 to chamber 87, causing main valve 13 to be moved downwardly into its intake position. Fluid will pass from supply port 46 through chamber 47 to chamber 49 and thence through port 48 to the device to be actuated.

This flow will cause a rise in the pressure sensed by sensing passage 64 and transmitted to chamber 98 of the safety valve. Since control valve 13' moves simultaneously with valve 13, chambers 98 and 98' of the safety valve will remain without pressure differential, and the safety valve will stay open. However, should valve 13 fail to move properly, the pressure in chamber 98 will be less than that in chamber 98', and safety valve spool 97 will move to the left in Figure 5, cutting off the connection between passages 22 and 23. Motor 12 will thus be rendered inoperative through the sequence of actions described with respect to Figure 1, depending on the disabling cause. After shutting off of fluid pressure, taking other safety precautions and correction of the fault, cap 108 may be removed and detent 105 withdrawn from its latching position, thus permitting spool 97 to return to its normally open central position, and the system may then again be put into operation. It will be understood that while the safety valve 21 shown in Figure 5 is illustrated as controlling fluid supply to pilot valves 19 and 19', according to the system of Figure 1, this safety valve could be likewise applied to control the fluid supply to main valves 13 and 13', as shown in Figure 2. In such a case, the intermediate flow areas within the valve body, such as the chamber 102, would be adjusted to conform to the capacities required for supplying the main valves.

Figure 6 illustrates a modified form of safety valve which uses a pair of diaphragms 111 and 111' adapted to be moved by differentials in pressure existing between chambers 112 and 112'. The valve housing 113 has end caps 114 and 114' bearing against seals 115 and 115' which in turn secure the diaphragms within the housing. Sensing ports 116 and 116' are adapted to be connected to the main valves in a manner similar to ports 96 and 96' of the safety valve in the previous embodiment, and these ports connect with chambers 112 and 112'. Diaphragms 111 and 111' are centrally secured to opposite ends of a spacer 117 by means of bolts 118 and 118' respectively, and this spacer extends through an annular member 19 formed as part of a central wall in the housing, the annular space 121 between spacer 117 and member 119 forming a passage between the two sides of the housing. In particular, passage 121 connects chambers 122 and 122', chamber 122' having a supply port 123 and chamber 122 having an outlet port 124 which may be connected to feed the pilot valves or the main valves. The opposite ends of member 119 form valve seats 125 and 125', and a pair of poppet type valves 126 and 126' are carried by the diaphragm members 111 and 111' and are adapted to engage valve seats 125 and 125' respectively.

The spacing between valves 126 and 126' is such that when the diaphragms are in their normal position, the valves are spaced from their respective valve seats, so that free passage of fluid between ports 123 and 124 is afforded through annular passage 121. A pair of helical springs 127 and 127' are disposed between the diaphragms and the opposite ends of the valve housing, namely, caps 114 and 114', and these springs tend to hold the diaphragms and valves in their central position. A pair of detents 128 and 128' are mounted on bolts 118 and 118' respectively by means of pivots 129 and 129'. When the diaphragm and valve assembly is moved axially in either direction, these detents are adapted to fall into detent position behind radial shoulders 131 and 131' which are formed on caps 114 and 114' respectively, or the detents may be spring-urged into such position. Means (not shown) such as crank handles on pivots 129 and 129' may be provided for withdrawing the detents from their detent positions when it is desired to reset the safety valve.

The operation of the safety valve shown in Figure 6 will be apparent from the foregoing description. Under normal conditions with no pressure differential between chambers 112 and 112', the safety valve will be in a position shown in Figure 6 with free flow being permitted from supply port 123 to outlet port 124. Should a pressure differential be set up, for example, with chamber 112 having a higher pressure than chamber 112', the diaphragm and valve assembly will be moved to the right, causing valve 126 to engage valve seat 125 and cutting off fluid flow between ports 123 and 124. At the same time, detent 128 will drop behind shoulder 131 so that the valve will be held in its closed position. After the fault in the system is corrected, detent 128 may be withdrawn to reset the safety valve with springs 127 and 127'.

Figure 7 illustrates another type of safety valve which serves not only to cut off the fluid supply to the control valves but also acts to connect the control valve to exhaust, and this valve therefore includes the exhaust connections indicated by reference numeral 27 in Figure 1 and by reference numeral 42 in Figure 2. The valve is shown for illustrative purposes as being of similar construction to that shown in Figure 5, although it will be understood that other types of constructions could be used. The valve includes a housing 165 enclosing a slidable spool generally indicated at 166, the housing being closed by end caps 167. A detent 168 engages the recessed central portion 169 of the spool which is provided with oppositely disposed shoulders engageable by the detent when the valve is moved from its central position, in which it is normally held by springs 171. The housing is provided with a supply port indicated at 172, an outlet port 173 leading to the control valves, and an exhaust port 174. The right end of spool 166 as shown in Figure 7 is provided with spaced lands 175 and 176, land 175 being disposed between ports 173 and 174 when the spool is in its central position. The left end of the spool is provided with spaced lands 177 and 178, land 177 being to the left of port 172 when the spool is in its central position. The housing is also provided with sensing ports 179 and 179' which lead to the chambers formed by the two ends of the spool, so that pressure differentials between the parallel branches of the system will cause spool 166 to shift either to the left or right.

It will be seen that when in its central or normal position, the spool will serve to connect supply port 172 with control valve port 173, exhaust port 174 being sealed off by land 175. If spool 166 is shifted to the left due to a pressure differential, detent 168 will hold the spool in such a position that supply port 172 is cut off from control valve port 173 by land 175, while port 173 is connected to exhaust port 174 by the annular chamber formed between lands 175 and 176. Should spool 166 be moved to the right, detent 168 will hold it in such a position that port 172 is sealed off from port 173 by land 177, while port 173 is connected to port 174 by the annular chamber surrounding recessed portion 169 of the spool. In either position therefore, the safety valve will serve not only to cut off the fluid supply to the control valves, but will also serve to vent these control valves through exhaust port 174.

As stated previously, the locations at which pressure differentials are sensed between the two control branches acting in parallel may be varied to suit particular conditions of the installation. Figures 8, 9 and 10 illustrate various positions in which the sensing means may be placed. Each of these figures illustrates in somewhat simplified form a pair of main valves in a valve housing, the pilot valves in each case being omitted. Figure 8 illustrates the manner in which pressure may be sensed at the inlet ports of the main valves. The housing 132 encloses a pair of main valves 133 and 133', these valves having actuating piston portions 134 and 134', inlet valve portions 135 and 135' and exhaust valve portions 136 and 136'. The housing 132 has an inlet chamber 137 supplied by a supply port 138, an outlet chamber 139 leading to an outlet port 141 and a pair of exhaust chambers 142 and 142' leading to exhaust ports 143 and 143' respectively. Springs 144 and 144' urge the control valves into their exhaust position.

As illustrated, the sensing conduits 145 and 145' are mounted in interior wall 146 of the housing and extend into inlet chamber 137. These conduits have radial passages 146 and 146' which connect with axial passages 147 and 147' respectively. It will be observed that when valves 133 and 133' are in the exhaust position shown in Figure 8, conduits 145 and 145' will sense the total pressure within chamber 137. When the inlet valves 135 and 135' are opened, the conduits will sense the static pressure within chamber 137, and should one of the inlet valves fail to operate properly, the subsequent change of fluid flow within chamber 137 will cause a pressure differential to be created between conduits 145 and 145'. This pressure differential may serve to actuate a safety valve of the types shown in Figures 5 or 6.

Figure 9 illustrates a construction in which the sensing means is located at the exhaust ports of the main valves. In this embodiment, housing 148 encloses main valves 149 and 149' as in the previous embodiment. Supply port 151, outlet port 152 and exhaust ports 153 and 153' are formed in the housing, the valves controlling the fluid flow between these ports in the manner previously described. In the present instance, sensing conduits 154 and 154' are positioned at exhaust ports 153 and 153' respectively. As shown, the beveled ends 155 and 155' of the sensing conduits face the flow of exhaust fluid, so that the conduits will sense total pressure when the valves are in their exhaust position. Failure of one of the parallel branches will as in the previous embodiments cause a pressure differential to be created between the sensing conduits, thereby operating the safety valve. It will be observed that if desired the beveled ends of the sensing conduits could be positioned 180° from their illustrated position, and would thus sense only static pressure. In each instance however failure of one of the branches will create the necessary pressure differential to operate the safety valve.

Figure 10 illustrates still another manner in which the sensing conduits can be mounted in the main valve housing. The housing 156 carries main valves 157 and 157', with supply port 158, outlet port 159 and exhaust ports 161 and 161' as previously described. Sensing conduits 162 and 162' are in this embodiment positioned within outlet chamber 163 leading to port 159. In this position, the sensing conduits will sense total pressure whenever inlet valves 164 and 164' are open, and any difference between the operating positions of the valves will thus create the necessary pressure differential within the outlet chamber 163 to operate the safety valve.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a system for controlling a fluid actuated device, a pair of main valves, parallel outlet connections between said main valves and said device, said main valves having parallel supply connections and exhaust connections, means for moving said main valves in synchronism between a supply position in which said supply connections are connected with said outlet connections and an exhaust position in which said outlet connections are connected to said exhaust connections, said main valve moving means comprising a pair of pilot valves, supply and exhaust connections for said pilot valves, outlet connections between said pilot valves and said main valves, said main valves being movable to their supply positions when said pilot outlet connections are connected to said pilot supply connections, means for moving said main valves to their exhaust positions when said pilot outlet connections are connected to said pilot exhaust connections, a safety valve interposed in said pilot supply connections, said safety valve being movable between a normal position allowing uninterrupted flow to said pilot supply connections and a safety position shutting off said flow, and sensing connections between said main valves and said safety valve, the safety valve being movable from its normal position into its safety position in response to a pressure differential between said sensing connections.

2. The combination according to claim 1, further provided with detent means for holding said safety valve in its safety position.

3. In a system for controlling a fluid actuated device, a pair of three-way control valves, each of said valves having a supply port, an outlet port, and an exhaust port, the valves being operable in parallel to supply and exhaust said fluid actuated device, a poppet valve forming part of each of said control valves and disposed between said supply port and said outlet port, a sensing passage forming part of each of said control valves adjacent said poppet valves, said control valve ports being adapted to conduct fluid in said control system independently of said sensing passages, said sensing passages being adapted to sense changes in pressure at said poppet valves when moved between open and closed positions, safety means shiftable between an inactive normal position allowing uninterrupted flow of fluid in said control system and a safety position disenabling said control system, and connections between said sensing passages and said safety means, the safety means being shiftable from its normal to its safety position in response to a pressure differential between said sensing passages.

4. In a system for controlling a fluid actuated device, a pair of three-way valves, said valves being connected in parallel to said device, each valve having a supply connection, an outlet connection to said device and an exhaust connection, safety means shiftable between an inactive normal condition allowing uninterrupted flow of fluid in said control system and a safety condition disenabling said control system, and a sensing passage at the supply connection of each of said valves, said control valve connections being adapted to conduct fluid in said control system independently of said sensing passages, said sensing passages being connected to said safety means and adapted to sense pressure changes in said supply connections, the safety means being shiftable from its normal condition to its safety condition in response to a pressure differential between said sensing passages.

5. In a system for controlling a fluid actuated device, a pair of three-way valves, said valves being connected in parallel to said device, each valve having a supply connection, an outlet connection to said device and an exhaust connection, safety means shiftable between an inactive normal condition allowing uninterrupted flow of fluid in said control system and a safety condition disenabling said control system, and a sensing passage at the exhaust connection of each of said valves, said control valve connections being adapted to conduct fluid in said control system independently of said sensing passages, said sensing passages being connected to said safety means and adapted to sense pressure changes in said exhaust connections, the safety means being shiftable from its normal condition to its safety condition in response to a pressure differential between said sensing passages.

6. In a system for controlling a fluid actuated device, a pair of three-way valves, said valves being connected in parallel to said device, each valve having a supply connection, an outlet connection to said device and an exhaust connection, safety means shiftable between an inactive normal condition allowing uninterrupted flow of fluid in said control system and a safety condition disenabling said control system, and a sensing passage at the outlet connection of each of said valves, said control valve connections being adapted to conduct fluid in said control system independently of said sensing passages, said sensing passages being connected to said safety means and adapted to sense pressure changes in said outlet connections, the safety means being shiftable from its normal condition to its safety condition in response to a pressure differential between said sensing passages.

7. In a system for controlling a fluid actuated device, a pair of parallel fluid control branches, valves in said branches operable in synchronism to actuate said device, a fluid supply connection for said parallel branches, safety means in said supply connection, said safety means including a valve in said connection normally occupying a central open position, oppositely disposed pressure actuating areas on said valve, the valve being movable in either direction into closed position in response to a pressure differential between said areas, and sensing connections between said parallel control branches and said pressure actuating areas.

8. In a system for controlling a fluid actuated device, a pair of parallel branches, main valves in said parallel branches operable in synchronism to control said device, pilot valves for operating said main valves, said pilot valves and main valves having fluid supply connections, and safety means movable between a normal position in which said supply connections are unobstructed and a safety position in which said supply connections are obstructed, said safety means being responsive to a discrepant pressure condition between said parallel branches for movement from its normal position to its safety position.

9. In a system for controlling a fluid actuated device, a pair of main valves operable in parallel to control said device, means for supplying fluid to said main valves, and safety means movable between a first position permitting uninterrupted flow from said supply means and a safety position obstructing said flow and venting said main valves, said safety means being movable in response to a discrepant pressure condition between said valves from its normal position to its safety position.

10. In a system for controlling a fluid actuated device, a pair of main valves having parallel connections to said device, a pair of pilot valves operable in synchronism for actuating said main valves, supply connections for said main valves, a safety valve interposed in said supply connections, said safety valve being movable between a normal position in which said supply connections are unobstructed and a safety position in which said supply connections are vented, and sensing connections between said main valves and said safety valve, the safety valve being movable from its normal position to its safety position in response to pressure differentials between said sensing connections.

11. In a system for controlling a fluid actuated device, a pair of parallel fluid control branches, valves in said branches operable in synchronism to actuate said device, a fluid supply connection for said parallel branches, safety means in said supply connection, said safety means including a safety valve having a supply port, an outlet port connected to said parallel branches, and an exhaust port, said safety valve normally occupying a central position in which said supply port and said outlet port are connected, oppositely disposed pressure actuating areas on said safety valve, the safety valve being movable in either direction into a position connecting said outlet port and said exhaust port in response to a pressure differential between said areas, and sensing connections between said parallel control branches and said pressure actuating areas.

12. In a system for controlling a fluid actuated device, a pair of parallel branches, main valves in said parallel branches operable in synchronism to control said device, pilot valves for operating said main valves, said pilot valves and main valves having fluid supply connections, and safety means movable between a normal position in which said supply connections are unobstructed and a safety position in which at least part of said supply connections are disenabled, said safety means being responsive to a discrepant pressure condition between said parallel branches for movement from its normal position to its safety position.

13. In a system for controlling a fluid actuated device, a pair of parallel branches, main valves in said parallel branches operable in synchronism to control said device, pilot valves for operating said main valves, said pilot valves and main valves having fluid supply connections, and safety means movable between a normal position in which said supply connections are unobstructed and a safety position in which at least part of said supply connections are disenabled, said safety means being responsive to discrepant positions of said pilot valves for movement from its normal position to its safety position.

14. In a system for controlling a fluid actuated device, a pair of parallel branches, four-way control valves in said parallel branches operable in synchronism to control said device, said control valves having fluid supply connections, and safety means movable between a normal position in which said supply connections are unobstructed and a safety position in which said supply connections are disenabled, said safety means being responsive to a discrepant pressure condition between said parallel branches for movement from its normal position to its safety position.

15. In a system for controlling a fluid actuated device, a pair of parallel fluid control branches having valves operable in synchronism to control the flow of fluid which actuates said device, a supply conduit for said valves, safety means in said supply conduit shiftable between an inactive normal condition allowing uninterrupted fluid flow in said supply conduit and a safety condition in which said supply conduit is disenabled, and means responsive to a discrepant pressure condition between said parallel branches to cause said safety means to shift from its normal condition to its safety condition.

16. In a system for controlling a fluid actuated device, a plurality of valves, said valves being operable in synchronism and having connections for supplying and venting fluid from said device, a supply connection for supplying fluid to the supply ports of said valves, safety valve means in said supply connection, said safety valve means being movable between a normal position allowing uninterrupted flow of fluid to said supply ports and a safety position interrupting such flow, and means responsive to discrepant positions between said valves for moving said safety valve means from its normal position to its safety position.

17. The combination according to claim 16, further provided with sensing connections between said valves and said safety valve means, the safety valve means being movable from its normal position to its safety position in response to pressure differentials between said sensing connections.

18. The combination according to claim 16, said safety valve means cutting off the fluid supply to said valves when in its safety position.

19. The combination according to claim 16, said safety valve means venting the fluid supply to said valves when in its safety position.

20. In a system for controlling a fluid actuated device, a pair of parallel branches, a pair of valves in said branches operable in synchronism to control said device, each of said valves having a supply connection, a vent connection, and a connection to said device, safety means for controlling fluid flow to said supply connections, said safety means being shiftable between a normal condition in which said supply flow is uninterrupted and a safety condition in which said supply flow is interrupted, and means responsive to a discrepant flow condition between said parallel branches for shifting said safety means from its normal condition to its safety condition.

21. In a system for controlling a fluid actuated device, parallel branches, main valves in said parallel branches operable in synchronism to control said device, said main valves having supply and vent connections for said device, pilot valves for operating said main valves, said pilot valves having fluid supply connections, and safety means movable between a normal position in which flow in said pilot valve supply connections is uninterrupted and a safety position in which said flow is interrupted, said safety means being responsive to a discrepant pressure condition between said parallel branches for movement from its normal position to its safety position.

22. In a system for controlling a fluid actuated device, a first pair of two-way valves, supply connections for said valves, a pair of parallel conduits connecting said valves to a fluid actuated device, a second pair of two-way valves, vent connections for said second pair of valves, a second pair of parallel conduits connecting said fluid actuated device to said second pair of valves, two pairs of pilot valves for controlling said first and second pairs of two-way valves, supply connections for said pilot valves, a safety valve in the supply connections of at least one pair of said pilot valves, said safety valve being movable between a normal position in which said connections are unobstructed and a second position in which said safety connections are disenabled, and pressure sensing means connecting one of said pairs of main valves with said safety valve, whereby a discrepant pressure condition between said one pair of main valves will cause said safety valve to move from its normal position to its safety position.

23. In a system for controlling a fluid actuated device, a pair of main valves operable in synchronism to control said device, said main valves having parallel outlet connections to the device, supply connections and exhaust connections for said main valves, each valve being movable between a supply position supplying fluid to said outlet connection and an exhaust position exhausting said outlet connection, pilot valves for operating said main valves, supply and exhaust connections for said pilot valves, said pilot valves being operable between a first position moving said main valves into their supply positions and a second position moving said main valves into their exhaust positions, and safety means connected to the supply connections of said pilot valves, said safety means being operable from a normally inactive position allowing uninterrupted flow to said pilot supply connections, to a safety position in response to discrepant positions between said main valves to interrupt flow to said pilot supply connections.

24. The combination according to claim 23, further provided with means for sensing a pressure differential caused by said discrepant main valve positions, said sensing means being connected to said safety means so that said pressure differential causes movement of the safety means from its normal position to its safety position.

25. In a system for controlling a fluid actuated device, a pair of three-way control valves, each of said valves having a supply port, an outlet port and an exhaust port, the valves being operable in parallel to supply and exhaust said fluid actuated device, a poppet valve forming part of each of said control valves and disposed between said supply port and said outlet port, a sensing passage forming part of each of said control valves adjacent said poppet valves, said poppet valves being each further provided with a substantially radial shoulder portion, said sensing passages being formed in said shoulder portions, the shoulder portions forming fluid flow restrictions when said poppet valves are in their open position, said sensing passages being adapted to sense changes in pressure at said poppet valves when moved between open and closed positions, safety means shiftable between an inactive normal position allowing uninterrupted flow of fluid in said control system and a safety position disenabling said control system, and connections between said sensing passages and said safety means, the safety means being shiftable from its normal to its safety position in response to a pressure differential between said sensing passages.

References Cited in the file of this patent
UNITED STATES PATENTS

| | | |
|---|---|---|
| 2,013,102 | Ledbetter | Sept. 3, 1935 |
| 2,145,294 | Daly | Jan. 31, 1939 |
| 2,268,733 | Williams | Jan. 6, 1942 |
| 2,341,696 | Davis | Feb. 15, 1944 |
| 2,346,829 | Davis | Apr. 18, 1944 |
| 2,426,364 | Massicar | Aug. 26, 1947 |
| 2,451,010 | Yanchenko | Oct. 12, 1948 |
| 2,598,907 | Griffin | June 3, 1952 |
| 2,613,787 | Ledig | Oct. 14, 1952 |
| 2,620,820 | Born | Dec. 9, 1952 |
| 2,638,928 | Stadler | May 19, 1953 |
| 2,687,117 | Evrell | Aug. 24, 1954 |